(12) United States Patent
Kalbus et al.

(10) Patent No.: US 9,358,887 B2
(45) Date of Patent: Jun. 7, 2016

(54) USER INTERFACE

(71) Applicant: Harman Becker Automotive Systems GmbH, Karlsbad (DE)

(72) Inventors: Peter Kalbus, Karlsruhe (DE); Davide Di Censo, San Mateo, CA (US)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 14/563,961

(22) Filed: Dec. 8, 2014

(65) Prior Publication Data

US 2015/0158388 A1 Jun. 11, 2015

Related U.S. Application Data

(60) Provisional application No. 61/913,813, filed on Dec. 9, 2013.

(51) Int. Cl.
| | | |
|---|---|---|
| *B60K 35/00* | (2006.01) | |
| *B60K 37/06* | (2006.01) | |
| *G06F 3/048* | (2013.01) | |
| *G06F 3/0488* | (2013.01) | |

(52) U.S. Cl.
CPC ............. *B60K 35/00* (2013.01); *B60K 37/06* (2013.01); *B60K 2350/1004* (2013.01); *B60K 2350/1028* (2013.01); *B60K 2350/1052* (2013.01); *G06F 3/04883* (2013.01)

(58) Field of Classification Search
CPC ...... B60K 35/00; B60K 37/06; G06F 3/0488; G06F 3/17

USPC ............ 701/36, 41, 1; 340/435; 370/252, 253
See application file for complete search history.

(56) References Cited

U.S. PATENT DOCUMENTS

| | | | | |
|---|---|---|---|---|
| 6,768,962 B2 * | 7/2004 | Bullinger | ............... | B62D 1/046 701/41 |
| 7,987,030 B2 * | 7/2011 | Flores | .................. | B60Q 3/0233 340/435 |
| 2006/0047386 A1 * | 3/2006 | Kanevsky | .............. | B60K 35/00 701/36 |
| 2008/0071177 A1 * | 3/2008 | Yanagidaira | ........... | A61B 5/024 600/483 |
| 2012/0068946 A1 * | 3/2012 | Tang | ..................... | G06F 3/0488 345/173 |
| 2012/0179328 A1 * | 7/2012 | Goldman-Shenhar | . | B62D 1/046 701/36 |

* cited by examiner

*Primary Examiner* — Tan Q Nguyen
(74) *Attorney, Agent, or Firm* — Alleman Hall McCoy Russell & Tuttle LLP

(57) ABSTRACT

A user interface is configured to control a vehicle control system. The user interface comprises a first touch pad on a back side of a steering wheel of a vehicle. The user interface further comprises a second touch pad arranged on the back side of the steering wheel. The user interface further comprises a processor which is configured to detect a first gesture on the first touch pad and a second gesture on the second touch pad in a correlated manner. The processor is further configured to generate at least one control message for the vehicle control system based on a first gesture and based on a second gesture.

20 Claims, 7 Drawing Sheets

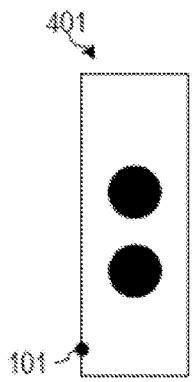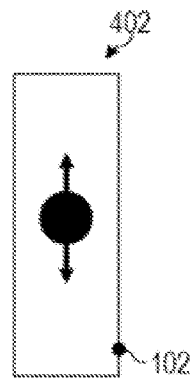 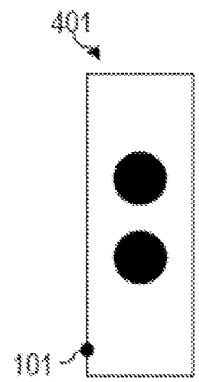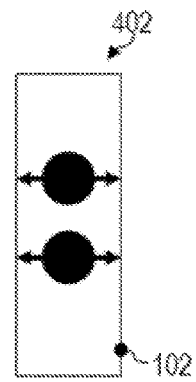
FIG. 5A FIG. 5D
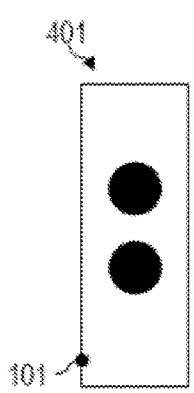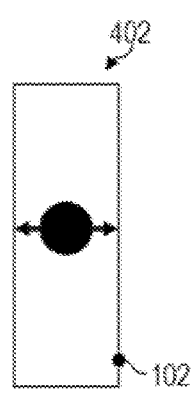 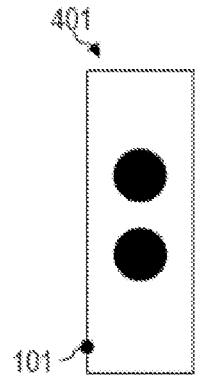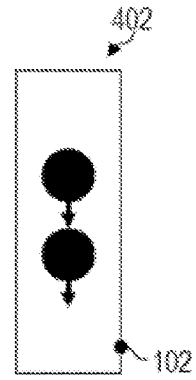
FIG. 5B FIG. 5E
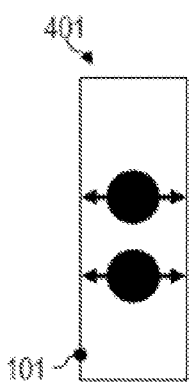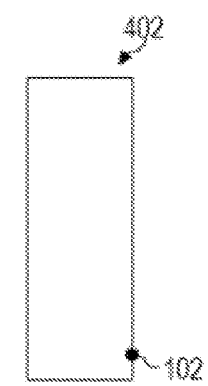 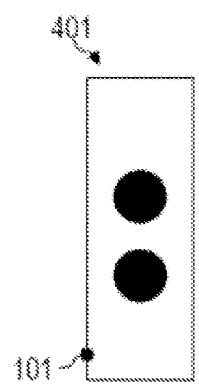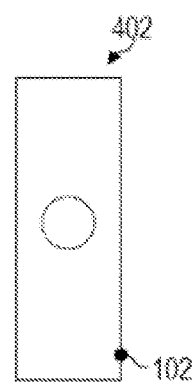
FIG. 5C FIG. 5F

USER INTERFACE

CROSS-REFERENCE TO RELATED APPLICATIONS

This application claims priority to U.S. Provisional Patent Application No. 61/913,813, entitled "USER INTERFACE," filed Dec. 9, 2013, the entire contents of which are hereby incorporated by reference for all purposes.

TECHNICAL FIELD

Various embodiments relate to a user interface configured to control a vehicle control system and to a method of controlling a vehicle control system. In particular, various embodiments relate to techniques of controlling the vehicle control system by means of a first gesture and a second gesture which are detected simultaneously on a first touchpad and on a second touchpad, respectively.

BACKGROUND

Modern vehicles typically offer a large number of functions to be controlled. Such functions relate to various functional blocks of the vehicle, e.g., to a climate control system, a navigation system, a multimedia system, etc.

The large number of functions to be controlled often results in complex user interfaces. Such user interfaces often require to remove the hands from the steering wheel to access and execute operations, e.g., at a central control unit and/or a display and/or a haptic controller. Other user interfaces are restricted to linear single event controlling by speech input or multi-function controllers; in such scenarios it is often necessary to issue a series of commands until the desired function finally is executed. Sometimes more or less complex menu structures need to be navigated through. Often, complex user interfaces require significant attention from the driver. As a result, some functions are only available in non-driver environments. For example, operation of the user interface may be at least partially restricted to the resting vehicle or to the co-driver.

In order to address the above-described issues, the present disclosure provides embodiments for advanced user interfaces in a vehicle. For example, such advanced user interfaces may enable simple and direct control of functions of a vehicle control system. Further, such user interfaces may enable control of a vehicle control system without significant driver distraction.

SUMMARY

BRIEF DESCRIPTION OF DRAWINGS

FIGS. 4A-7C illustrate example first gestures and example second gestures in accordance with one or more embodiments of the present disclosure.

DETAILED DESCRIPTION

Figure 1:
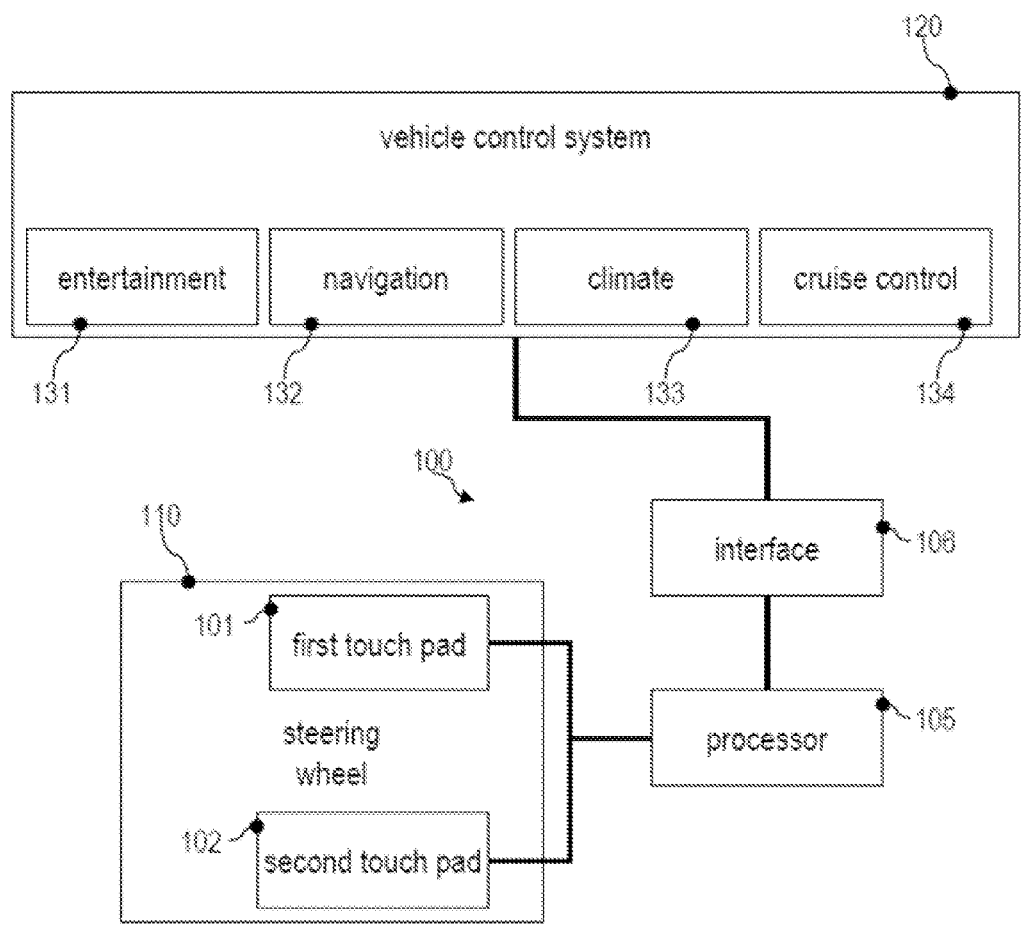
FIG. 1 is a schematic illustration of a user interface, a steering wheel, and a vehicle control system in accordance with one or more embodiments of the present disclosure.

According to a first aspect, a user interface configured to control a vehicle control system is provided. The user interface comprises a first touch pad which is arranged at a first position on a back side of a steering wheel of a vehicle. The user interface further comprises a second touch pad which is arranged at a second position on the back side of the steering wheel. The second position is different from the first position. The user interface further comprises a processor which is configured to detect a first gesture on a first touch pad and a second gesture on a second touch pad in a correlated manner. The processor is further configured to generate at least one control message for the vehicle control system based on the first gesture and based on the second gesture. The user interface further comprises a data interface which is coupled to the processor. The interface is configured to send the at least one control message to the vehicle control system.

In some examples, the first touch pad and/or the second touch pad may be capacitive or optical touch pads. For example, the first touch pad and the second touch pad may be configured such that it is possible to detect a finger of a user being positioned in proximity to the surface of the touch pad. In additional or alternative examples, the first and second touch pads may be configured such that a touch event is only detected if a finger of the user is in direct contact with the respective surface—thereby unintentional touch events may be avoided. Alternatively or additionally, it may also be possible to detect a force exerted by the finger on the touch pad; then a touch event may be specified by the user-exerted force exceeding a predefined threshold or the like. In general, the first touch pad and the second touch pad may each have touch sensitive surfaces which are flush with an outer surface of the steering wheel. By this, the sensation on the first touch pad and the second touch pad being fully integrated into the steering wheel may be obtained. The arrangement described above may make it easier and safer to handle both the first and second touch pads, as well as the steering wheel. The first touch pad and the second touch pad may additionally or alternatively be arranged underneath an outer surface of the steering wheel. In other words, the outer surface of the steering wheel may be continuously formed and the first and second touch pads may be arranged underneath that surface which may be a contiguous surface. In some examples, the outer surface of the steering wheel may be made out of plastic, leather, wood, and/or any other non-conductive material or combination of materials. For example, the first and second touch pads may be capacitive first and second touch pads.

The gesture may, in general, relate to one or more touch events to the touch pads. A time-dependency and/or a spatial position of the one or more touch events may be used to classify the particular gesture. For example, touching with a single finger (or three fingers) may relate to a gesture including a single touch event (or three touch events). The time-dependency may relate to the duration of the touch event, e.g., short touch (touch-and-release) vs. long touch (touch-and-hold). The spatial position may relate to the touch event(s) occurring only at one given position or the touch event(s) including a movement into a certain direction (moving gesture).

The first touch pad may be a multi-touch touch pad. The second touch pad may be a multi-touch touch pad. The first gesture and/or the second gesture may be multi-touch gestures comprising a plurality of touch events. By such techniques, a more detailed control and execution of functions of the vehicle control system may be obtained. In particular, by a single multi-touch gesture, a large number of different functions may be uniquely identified.

In some examples, the vehicle control system may be a central vehicle head unit. The vehicle control system may operate as the central control entity of various vehicle components. For example, the vehicle control system can be a single physical entity or can comprise a number of distinct and separate physical entities that may be distributed throughout the vehicle. Various functional blocks of the vehicle control system may be in communication, e.g., via a vehicle bus system.

In some examples, the at least one control message may include an indication of a functional block of the vehicle control system wherein each functional block is associated with a set of functions controlling a particular vehicle component. The at least one control message may further include an indication of a function to be executed by the indicated functional block of the vehicle control system. In other words, the control message may, firstly, specify a particular functional block of the vehicle control system and, secondly, specify the particular function for that particular functional block which is to be executed. For example, the functional block may be selected from the group comprising: entertainment system; climate control system; navigation system; cruise control system. It is to be understood that further functional blocks are possible, relating to the various vehicle components., e.g., a seat configuration system; driver assistance system; mobile telephony system. In general, the set of functions of two functional blocks may at least partially overlap.

The indication included in the control message may be in implicit form or in explicit form. For example, the indications can be in an implicit form according to a predefined set of rules negotiated between the user interface and the vehicle control system. In additional or alternative examples, the indication of the function to be executed may be specified in connection with the indication of the functional block. The data interface and the vehicle control system may communicate via a direct coupling, wirelessly, and/or via a vehicle bus system.

By provisioning both the indication of the functional block, as well as the indication of the function to be executed, a direct access of the function may be achieved. In particular, it may not be necessary or it may only be necessary to a limited degree to navigate through menus and sub-menus until the desired function is reached in the menu structure and can be executed. This makes the control of the vehicle control system easier, safer, and less distracting for the driver.

In some examples, the processor may be configured to generate the indication of the functional block based on the first gesture. The processor may further be configured to generate the indication of the function to be executed based on the second gesture. Optionally, the processor may be configured to generate the indication of the function to be executed based on the first gesture. In other words, the first gesture may specify the particular functional block to be addressed; while the second gesture may specify the particular function of the set of functions associated with the particular functional block. In this sense, one and the same second gesture may trigger different functions to be executed, depending on the particular first gesture, respectively the particular functional block determined by the first gesture. In other words, the first gesture may set the framework within which the second gesture defines the particular function to be executed.

Such a hierarchy between the first and second gestures may allow a simple and intuitive operation of the user interface and, in turn, control of the vehicle control system. As can be seen, an intuitive and easy-to-learn control language may be provided, e.g., by defining the functional block via actions with respect to the first touch pad and by defining the particular function to be executed via actions with respect to the second touch pad. This may make it easier to remember a large number of potential gestures which are, thereby, classified and grouped.

In some examples, the processor may be configured to generate the indication of a functional block based on a number of touch events of the first gesture. For example, the first gesture may be executed with a number of fingers of a user of the user interface, wherein the number of fingers is one or two or three or four. In additional or alternative examples, if the user touches the first touch pad with three fingers, the functional block relating to the navigation system may be selected.

The processor may be configured to generate the indication of the function to be executed based on a number of touch events of the second gesture and/or based on a direction of movement of a touch event of the second gesture. For example, if the second gesture relates to a touch-hold-and-move left gesture, a different function can be selected for execution than if the gesture relates to a touch-hold-and-move right gesture.

In some examples, the first gesture may be a touch-and-hold gesture, while the second gesture may be a moving gesture along a primary axis of the second touch pad. A primary axis of the second touch pad may correspond to a movement in parallel to a symmetry axis of the second touch pad, e.g., long axis, short axis, diagonal, etc., and/or in parallel to one of the edges of the second touch pad.

Further, the first gesture and/or the second gesture may be selected from the group comprising: touch-hold-and-move right; touch-hold-and-move left; touch-hold-and-move up; touch-hold-and-move down; touch-and-hold; and touch-and-release.

Move up, move down, move right, and move left may be defined with respect to a standard orientation of the touch pad, e.g., when the steering wheel is set to straight driving. These terms may alternatively or additionally also be defined with respect to a standard orientation of the first and second touch pads with respect of a user. These terms may alternatively or additionally be defined with respect to a general shape of the first or second touch pads, e.g., having a rectangular or elongate form; here up/down may be defined with respect to a movement along the long axis, while left/right may be defined with respect to a movement along the short axis.

In some examples, detecting the first gesture and the second gesture in a correlated manner may relate to: detecting the first gesture and the second gesture simultaneously; detecting the first gesture and the second gesture in immediate succession; detecting the first and second gesture at least partially overlapping in time; and/or detecting the second gesture within a certain predefined time period after the detecting of the first gesture. In other words, both the first and second can be detected in one context. Thereby, the particular control caused by the detected first and second gestures may be derived from the inter-play of the first and second gestures.

As can be seen from the above, the operation of the user interface may depend on both the first gesture and the second gesture. The processor may be configured to combine the detected first gesture and the detected second gesture to a combined gesture. The processor may be configured to generate the at least one control message based on the combined gesture. In other words, inputting solely an isolated first gesture or inputting solely an isolated second gesture may not have the same result as inputting the first and second gestures in a correlated manner.

According to a further aspect, an example method of controlling a vehicle control system of a vehicle is provided. The example method comprises a processor detecting a first gesture on a first touch pad. The first touch pad is arranged at a first position on a back side of a steering wheel of the vehicle. The method further comprises the processor detecting a second gesture on a second touch pad. The second touch pad is arranged at a second position at the back side of the steering wheel of a vehicle. The second position is different from the first position. The detecting of the first gesture and the detecting of the second gesture occurs in a correlated manner. The example method further comprises the processor generating at least one control message for the vehicle control system based on the first gesture and based on the second gesture. The example method further comprises a data interface sending the at least one control message to the vehicle control system.

For such a method according to the presently discussed aspect, effects can be obtained which are comparable to the effects which can be obtained with the user interface according to a further aspect of the present invention.

The various aspects and embodiments of the present application as described above and yet to be described below, may not only employed in the combinations as indicated, but also in further combinations or in isolation.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are explained which relate to user interfacing for controlling of a vehicle control system in a vehicle. By this, a particular function of a functional block of the vehicle may be executed/controlled. The user interfacing may be based on detecting a first gesture on a first touch pad and a second gesture on a second touch pad in a correlated manner. In one context; such detection may relate to detecting the first gesture and the second gesture in immediate succession, simultaneously, or at least partially overlapping in time. The first and second touch pads may be arranged on the back side of a steering wheel; thereby, the first and second touch pads may be reached by the driver without removing the hands of the driver from the steering wheel. In other words, the user interface may be operated by the driver during normal driving (e.g., while the hands rest on the steering wheel).

A particular command may be determined in dependence of both the first and second gestures. This enables direct and multi-dimensional access to a large number of functions via the operation by the combined first and second gestures.

Various embodiments relate to a certain control language implemented based on this simultaneously detecting. For example, while the first gesture may define the functional block to be addressed, the second gesture may define the particular function of that functional block to be executed. This further facilitates the control and makes it easier to keep track of a large number of potential gestures. Comparably simple gestures may be employed using such a hierarchical system and an easy-to-learn control language may be implemented.

The first gesture and the second gesture may be a touch-and-hold gesture, a touch-hold-and-move gesture, or a touch-and-release gesture. The first and second gestures may be multi-touch gestures including a plurality of touch events at the same point in time. For example, the number of fingers used for the first gesture may determine a functional block of the vehicle control system for which a function should be executed. The particular function to be executed, in turn, may be determined based on the second gesture, e.g., a movement direction or the like.

The first touch pad may be arranged on the back side of the steering wheel at a first position while the second touch pad may be arranged on the back side of the steering wheel at a second position being offset with respect to the first position. For example, the first touch pad may be arranged on the left-hand side of the back side of the steering wheel such that the first touch pad is accessible by the left hand of a user of the user interface. Likewise, the second touch pad may be arranged on a right-hand side on the back side of a steering wheel such that the second touch pad is accessible by a right hand of the user operating the user interface. In such a scenario, by applying a chording system or control language as illustrated above, a systematic user operation may be obtained as outlined in the following: the left hand of the user may be in charge of the chords to select the particular functional block of the vehicle control system; the right hand of the user may define the particular function to be executed. Such a configuration provides a simple control language and a low learning curve making the user interface accessible without significant training to new users. The control language is easy-to-memorize and mistakes are less likely to occur. The driver distraction can be lowered significantly and operation of the user interface in the vehicle environment becomes safer. The first gesture and the second gesture may be limited to four fingers (or less) in order to avoid having to take the hand off the steering wheel in some examples (e.g., the thumb and the palm are still in touch with the steering wheel all the time). The operation of the steering wheel does not need to be interrupted for the operation of the user interface. This makes the operation of the user interface in the vehicle environment safer.

In FIG. 1, a user interface 100 comprising a first touch pad 101, a second touch pad 102, a processor 105, and a data interface 106 is shown. The processor 105 may be configured to execute various tasks associated with the read out of the first and second touch pads 101 and 102, the detection and identification of the first and second gestures, the operation and control of the user interface 100, and the generation of control messages sent via the data interface 106 to vehicle control system 120. The processor 105 may fulfill further or different tasks. The data interface 106 and the vehicle control system 120 may be coupled via a vehicle bus system. It would also be possible that the user interface is integrated to a larger or smaller extent into the vehicle control system 120, e.g., as hardware and/or software.

As can be seen from FIG. 1, the first touch pad 101 and the second touch pad 102 are part of the steering wheel 110.

Figure 2:
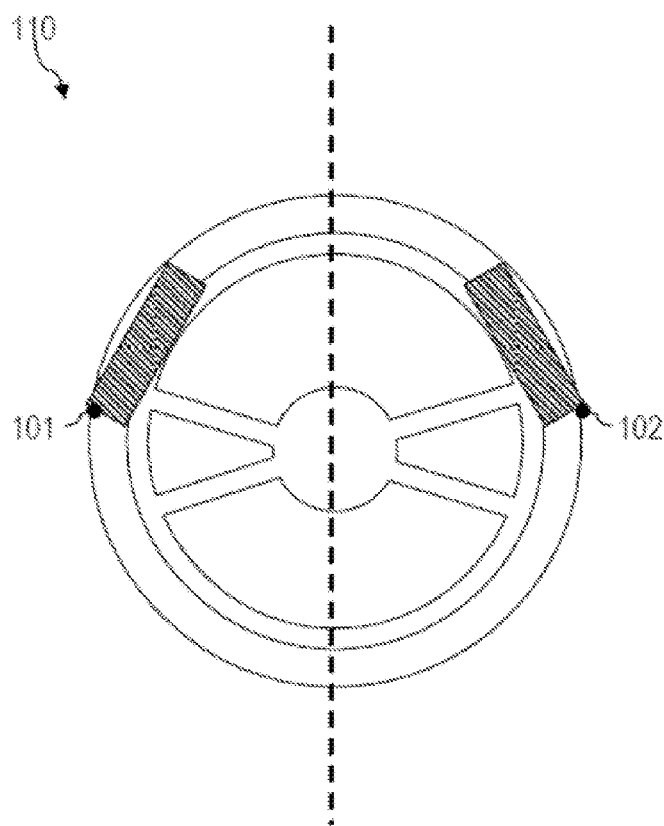
FIG. 2 is a schematic front view of a steering wheel including a first touch pad and a second touch pad at a back side thereof in accordance with one or more embodiments of the present disclosure.

However, it should be understood that the first and second touch pads 101, 102 may be separate physical entities coupled or attached to the steering wheel 110 in some examples. In FIG. 2, a front view of the steering wheel 110 is shown. Further illustrated in FIG. 2 are the first and second touch pads 101, 102. As can be seen from FIG. 2, the first and second touch pads 101, 102 are arranged symmetrically with respect to a radial axis of the steering wheel (illustrated with the dashed line in FIG. 2). If the steering wheel is in the 0° position (e.g., relating to straight driving of the vehicle), the radial axis is arranged vertically. Such a configuration is convenient as the arrangement enables easy access to the first and second touch pads 101, 102 to left and right hands of the driver of the vehicle. However, other arrangements of the first and second touch pads 101, 102 on the back side of the steering wheel 110 may be provided without departing from the scope of this disclosure. For example, the first and second touch pads 101, 102 may be arranged at approximately 3 o'clock and 9 o'clock positions, or at approximately 4 o'clock and 8 o'clock positions, or at approximately 12 o'clock and 6 o'clock positions (each of the above-described example positions being with respect to the 0° position of the steering wheel 110 for straight driving and may refer to the location of the center of the touch pads, the edge of the touch pads, and/or any other suitable region of the touch pads). The first and second touch pads 101, 102 may have a significant extent along the circumference of the steering wheel (e.g., extend between the 1 o'clock and 3 o'clock, respectively between 9 o'clock and 11 o'clock). In a scenario of FIG. 2, the first and second touch pads 101, 102 have rectangular shape. However, in general it should be understood that various different shapes of the first and second touch pads 101, 102 may be utilized without departing from the scope of this disclosure. For example, the first and second touch pads 101, 102 may be adapted to the circular shape of the steering wheel 110 (e.g., one or more of the touch pads may have curved edges).

Figure 3:
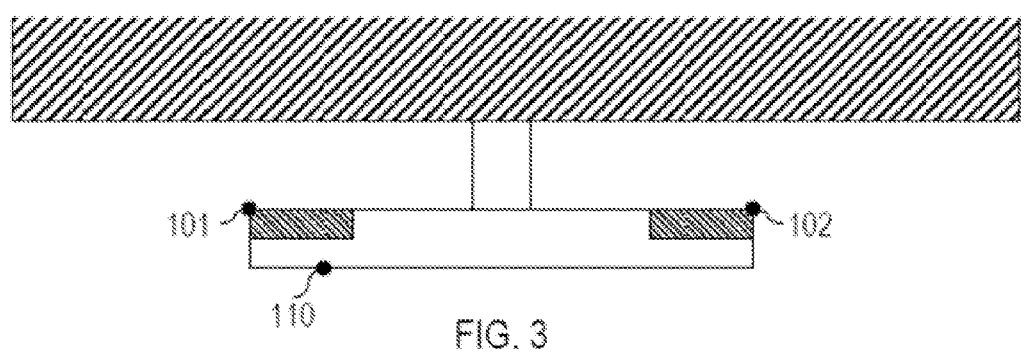
FIG. 3 is a top view of the steering wheel of FIG. 2 in accordance with one or more embodiments of the present disclosure.

Turning to FIG. 3, a top view of the steering wheel 110 is shown. As can be seen, the first and second touch pads 101, 102 are arranged at the back side/rear side of the steering wheel 110 (e.g., the side of the steering wheel 110 facing the dashboard of the vehicle and being further away from the driver of the vehicle). The first and second touch pads 101, 102 may have touch sensitive surfaces which are flush with an outer surface of the steering wheel. For example, in the region of the steering wheel 110 where the first and second touch pads 101, 102 are arranged, these touch sensitive surfaces may form the outer surface of a steering wheel 110. The first and second touch pads 101, 102 may additionally or alternatively be arranged underneath an outer surface of the steering wheel. In such a manner, the touch pads 101, 102 may be an integral part of the steering wheel 110 (e.g., the touch pads may be integrated with the steering wheel).

Turning back to FIG. 1, the processor 105 is configured to detect a first gesture on the first touch pad 101 and a second gesture on the second touch pad 102. In one scenario, the processor 105 is configured to detect the first and second gestures simultaneously, i.e., at least partially overlapping in time or fully overlapping in time. However, it would also be possible that the processor 105 is configured to, first, detect the first gesture and then, second, detect the second gesture, e.g., after lapsing of a predefined time interval and/or after a visual or audible verification output has been issued to the user. Based on both the detected first and second gestures, the processor 105 may be configured to generate a control message for the vehicle control system 120. The data interface 106 sends the control message to the vehicle control system 120. By this, control of the vehicle control system 120 based on the first and second gestures can be obtained. As can be seen, the interplay of the first and second gestures—which are detected in a correlated manner—may determine which control message is eventually sent.

In some examples, the control message can include instructions for different functional blocks 131-134 of the vehicle control system 120. The functional blocks 131-134 may relate to an entertainment system 131, a navigation system 132, a climate control system 133, and/or to a cruise control system 134. For example, the entertainment system 131 may be associated with a set of functions controlling vehicle components selected from a group including: radio, compact disc player, MP3 player, hard disk drive, cell phone, loudspeaker, etc. The navigation system 132 may be associated with a set of function controlling vehicle components selected from a group including: vehicle map view, route guidance, route search, global positioning system, etc. The climate control system 133 may be associated with a set of functions for controlling vehicle components selected from a group including: fan, air condition, de-frost of windshield, auxiliary heating system, seat heating, engine heating, etc. The cruise control system 134 may be associated with a set of function controlling vehicle components selected from a group including: throttle, break, adaptive distance control, speed limit detection, distance warning, lane departure warning, etc. It is to be understood that such listings as provided above are merely exemplary, and further different vehicle components and/or functions may be subject to the various functional blocks 131-134 of the vehicle control system 120.

As can be seen from the above, a wide variety of functions to be executed and potentially controlled by user input to the user interface may be performed. The set of functions may be dependent on the particular functional block 131-134, such that different functions may be associated with the entertainment system 131 (e.g., volume up/down, next/previous track, etc.), than with the navigation system 133 (e.g., pan or move map left/right, zoom in/out, etc.).

Therefore, the at least one control message may include an indication of one of the functional blocks 131-134 of the vehicle control system 120. Further, the control message may include an indication of the function to be executed by the indicated functional block 131-134 of the vehicle control system 120. In this manner, a particular function of the particular functional block 131-134 may be uniquely identified by the user input to the user interface. This enables the user of the user interface to have full control of the various functionalities of the vehicle control system 120.

However, to keep the control of the large number of functionalities of the vehicle control system 120 simple, a certain control language may be employed (e.g., to apply a system to the first and second gestures which makes it easier to remember which particular first and second gestures trigger a particular function to be executed).

In some examples, the processor 105 may be configured to generate the indication of the functional block 131-134 based on the first gesture (e.g., based on the user input to the first touch pad 101). Likewise, the processor 105 may be configured to generate the indication of the function to be executed based on the second gesture (e.g., based on the user input to the second touch pad 102). In such a scenario, one and the same second gesture may refer to a different function to be executed, in dependence on the particular functional block 131-134 selected based on the first gesture. Therefore, the total number of gestures for uniquely defining a particular functional block and a particular function to be executed may be comparably small; and certain gestures may be re-used for functions of different functional blocks.

In the following FIGS. 4A-4D, 5A-5F, 6A-6C, and 7A-7C, various first gestures 401 and second gestures 402 are schematically illustrated. In general, the first gesture 401 may be a touch-and-hold gesture where one or more fingers of a hand of a user touch the first touch pad 101 and rest on the first touch pad 102, e.g., until the second gesture 402 is finished. Such touch-and-hold gestures are indicated with a full circle in the FIGS. 4A-4D, 5A-5F, 6A-6C, and 7A-7C. The touch-and-hold gestures may be delimited against touch-and-release gestures where one or more fingers only shortly touch (e.g., tap) the touch pad 101, 102; these touch-and-release gestures are indicated by open circles in the FIGS. 4A-4D, 5A-5F, 6A-6C, and 7A-7C.

In some examples, the second gesture 402 may be a moving gesture (e.g., slide-to-activate) along a primary axis of the second touch pad 102. The moving gestures are illustrated with full circles and arrows in the direction of movement in the FIGS. 4A-4D, 5A-5F, 6A-6C, and 7A-7C. The primary axis may be selected from a group including: in parallel to a long axis of the second touch pad 102, in parallel to a short axis of the second touch pad 102, in parallel to a diagonal of two corners of a second touch pad 102, in parallel to one of the edges of the second touch pad 102, etc. In general, the first touch pad 101 and/or the second touch pad 102 can be multi-touch touch pads 101, 102. Likewise, the first gesture 401 and/or the second gesture 402 may relate to multi-touch gestures comprising a plurality of touch events. Multi-touch gestures may relate to multiple fingers of a hand of a user touching the first touch pad 101 and/or the second touch pad 102. For example, the first gesture 401 may be executed with a selected number of fingers of a user of the user interface 100, wherein the selected number of fingers is one, two, three, or four. Then, the processor 105 may be configured to generate the indication of the functional block 131-134 based on the number of touch events of the first gesture 401 (e.g., the number of fingers touching the first touch pad 101).

Figure 6A:
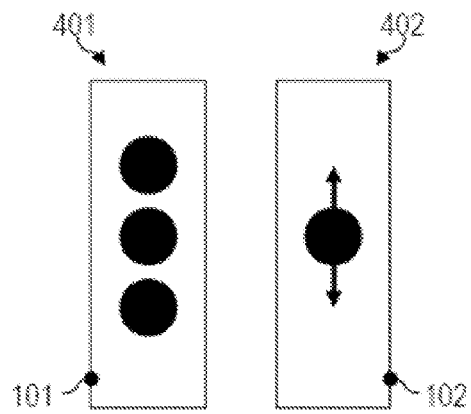
Figure 6B:
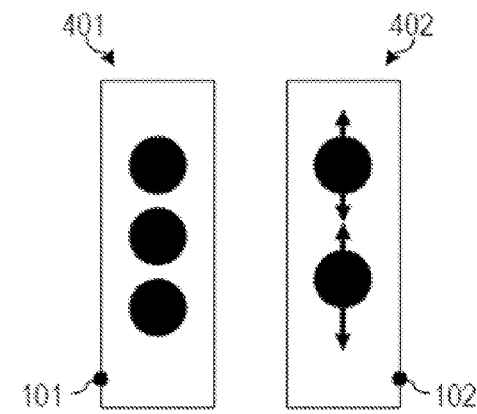
Figure 6C:
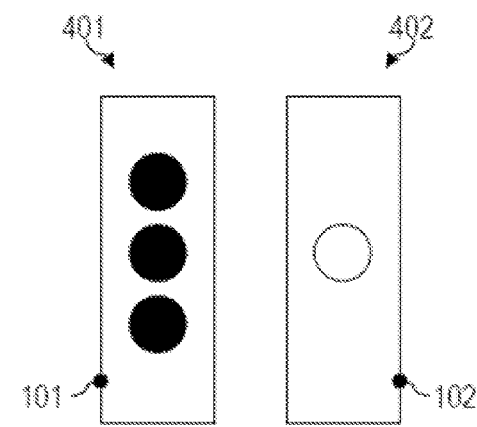
Figure 7A:
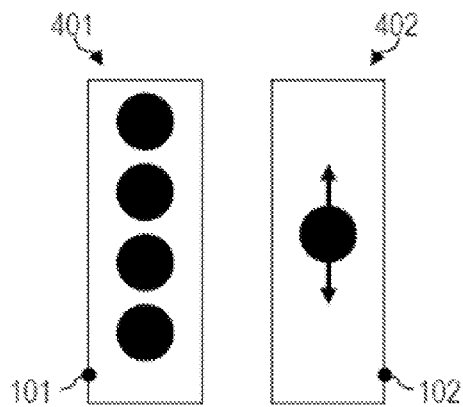
Figure 7B:
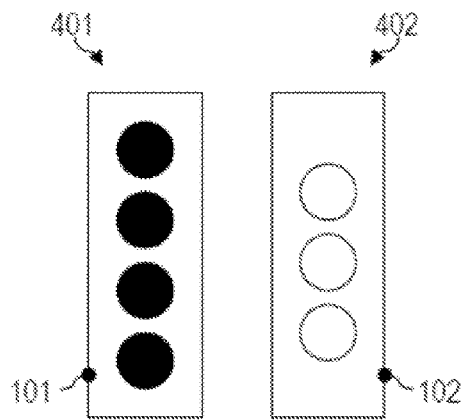
Figure 7C:
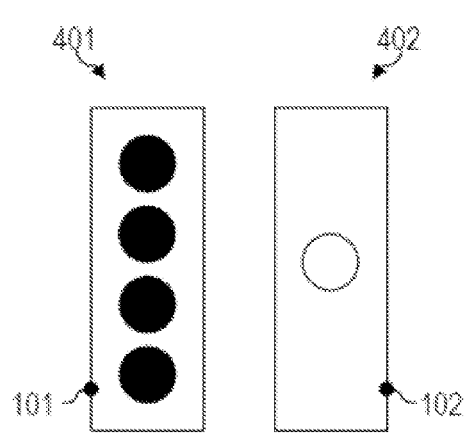

In some examples, touching the first touch pad 101 with one finger may result in indicating the entertainment system 131 (c.f. FIGS. 4A-4D); touching the first touch pad 101 with two fingers may result in including the indication of the navigation system 132 (c.f. FIGS. 5A-5F); touching the first touch pad 101 with three fingers may result in including the indication of the climate control system 132 (c.f. FIGS. 6A-6C); and touching the first touch pad 101 with four fingers may result in including the indication of the cruise control system 134 (c.f. FIGS. 7A-7C). In this way, the user may set the specific functional block 131-134 via the first gesture 401 by the number (e.g., the total number) of fingers employed for a touch-and-hold gesture at the first touch pad 101. As can be seen, this relates to a specific chording system allowing to identify the particular functional block 131-134 in the framework of a control language. It is to be understood that variations and modifications to such a control language are possible.

Likewise, the processor 105 may be configured to generate the indication of the function to be executed based on a number (e.g., a total number) of touch events of the second gesture 402 and/or based on a direction of movement of the second gesture. For example, the second gesture 402 may relate to a touch-hold-and-move right or left gesture (see FIGS. 4B, 4C, 5B, 5D). Likewise, the second gesture 402 may relate to a touch-hold-and-move up or down gesture (see FIGS. 4A, 5A, 5E, 6A, 6B, and 7A). In additional or alternative examples, the second gesture 402 may relate to a touch-and-release gesture (see FIGS. 4D, 5F, 6C, 7B, and 7C).

Figure 4A:
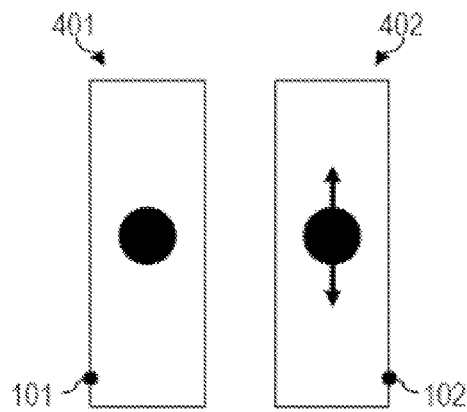
Figure 4C:
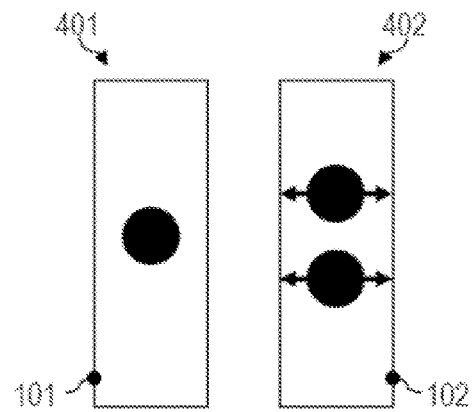
Figure 4B:
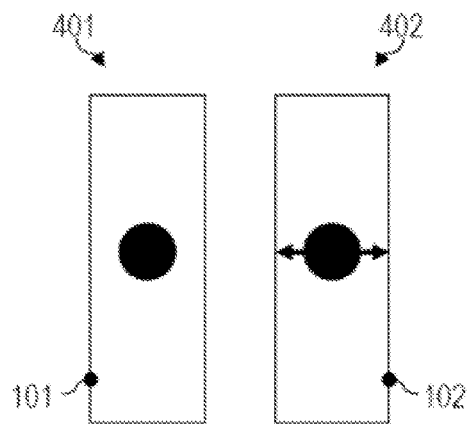
Figure 4D:
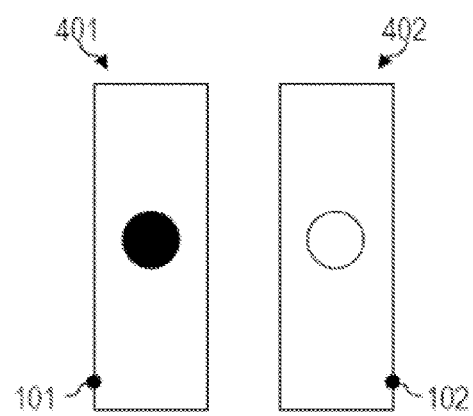

FIG. 4A relates to a scenario where the first gesture 401 is a one-finger touch-and-hold gesture and the second gesture 402 is a one-finger touch-hold-and-move up/down gesture. This may relate to indicating the entertainment system 131 and indicating the function volume up/down. In FIG. 4B, a scenario is shown where the first gesture 401 is a one-finger touch-and-hold gesture and the second gesture 402 is a one-finger touch-hold-and-move left/right gesture. This may result in the indication of the entertainment system 131 and indication of the function next track/previous track. In FIG. 4C a scenario is shown where the first gesture 401 corresponds to a one-finger touch-and-hold gesture and the second gesture 402 relates to a two-finger touch-hold-and-move left/right gesture. Such a combination of inputs may indicate the entertainment system 131 and the function next/previous playlist. In FIG. 4D a scenario is shown where the first gesture 401 relates to a one-finger touch-and-hold gesture and the second gesture 402 relates to a one-finger touch-and-release gesture. Such a combination of inputs may result in indicating of the entertainment system 131 and indication of the function mute on/off.

In FIGS. 5A-5F, the first gesture 401 relates to a two-finger touch-and-hold gesture. Such a combination of inputs may result in an indication of the navigation system 132 as the functional block. The second gesture 402 in FIG. 5A relates to a one-finger touch-hold-and-move up/down gesture, which may result in indication of the function move up/down in the map of the navigation system; thereby allowing the map view to be panned. In FIG. 5B, the second gesture 402 relates to a one-finger move left/right gesture and the corresponding indicated function may correspond to move left/right in map. In FIG. 5C, an example is shown where also the first gesture 401 is two-finger touch-hold-and-move left/right gesture and the second gesture 402 corresponds to a no-touch gesture. This may cause indication of the function zoom map for the navigation system 132. The same function may be indicated by the scenario shown in FIG. 5D, i.e., the first gesture 401 being a two-finger touch-and-hold gesture and the second gesture 402 being a two-finger touch-hold-and-move left/right gesture. In other words, the same function may be triggered by the first and second gestures 401, 402 of FIGS. 5C, 5D. In the scenario of FIG. 5E, the second gesture 402 relates to a two-finger touch-hold-and-move down gesture. This input may cause the function rotate map to be indicated in the control message. The scenario of FIG. 5F may cause the function mute route guidance on/off to be indicated in the control message.

In FIGS. 6A-6C, the first gesture 401 relates to a three-finger touch-and-hold gesture. This may cause an indication of the climate control system 132 in the control message. In the scenario of FIG. 6A, the function temperature up/down may be indicated in the control message. In FIG. 6B, the function fan speed up/down may be indicated in the control message. In the scenario of FIG. 6C, the function air conditioning on/off may be indicated in the control message.

In the scenarios of FIGS. 7A-7C, the first gesture 401 relates to a four-finger touch-and-hold gesture. This input may cause the cruise control system 134 to be indicated in the control message. In the scenario of FIG. 7A, the function vehicle velocity up/down may be indicated in the control message. In the scenario of FIG. 7B, the second gesture 402 relates to a three-finger touch-and-release gesture; which may relate to the function set/cancel being indicated in the control message. In the scenario of FIG. 7C, the function engage/disengage may be indicated in the control message. Each of the above-described actions for FIGS. 4A-7C may occur responsive to the illustrated combinations of first and second gesture inputs.

As can be seen from the above, various functions across the various functional blocks 131-134 may be included in the control message to be later executed by the particular functional block 131-134 of the vehicle control system 120. The particular functional block 131-134 may be uniquely identified by the first gesture 401 (e.g., by the total number of touch events). Likewise, the particular function to be executed for the given functional block 131-134 may be specified by the second gesture 402. Here, one and the same second gesture 402 can correspond to different functions to be executed, depending on the specific functional block 131-134 specified by the first gesture 401. This enables a systematic and easy-to-learn control language for the user interface 100.

Figure 8:
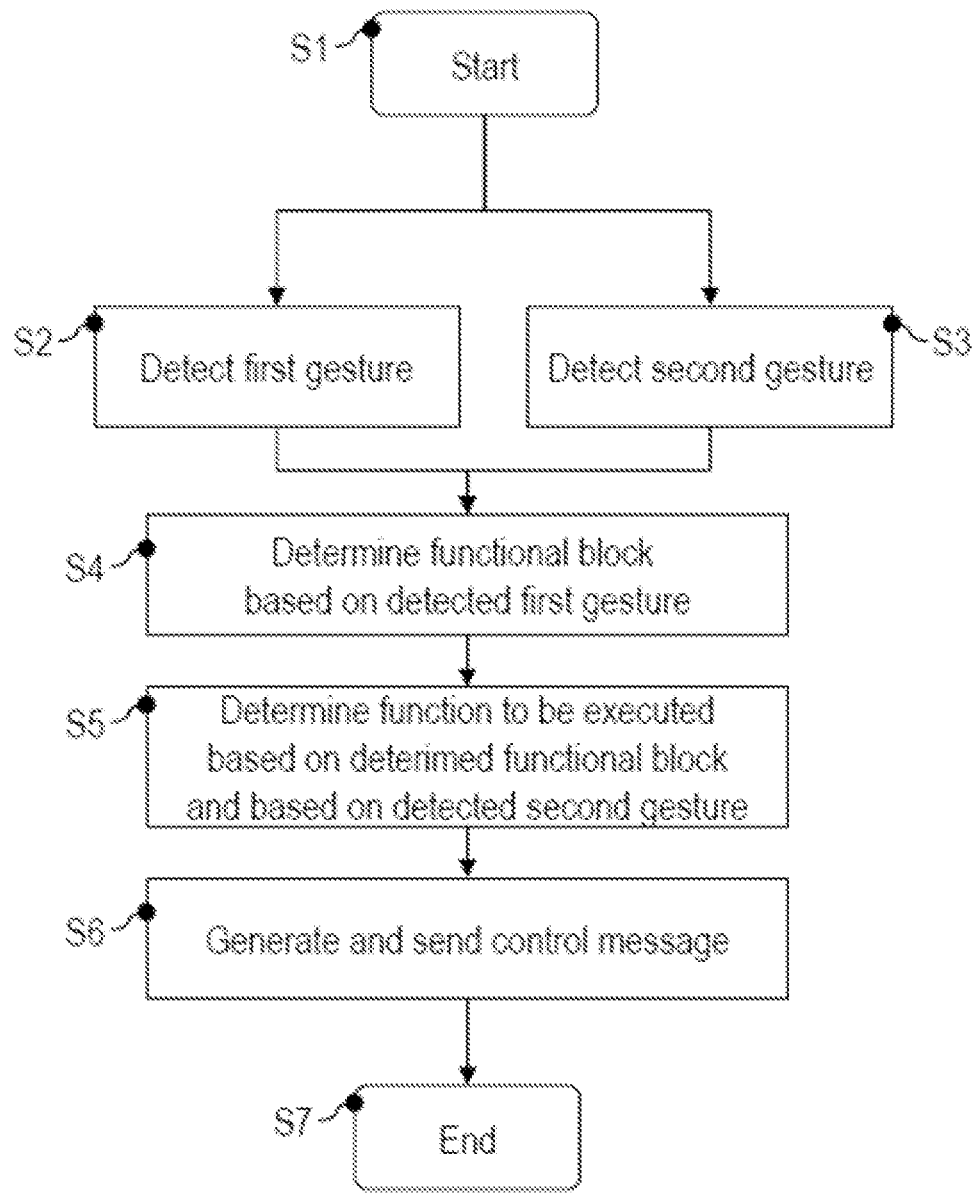
FIG. 8 is a flowchart of a method of controlling a user interface in accordance with one or more embodiments of the present disclosure.

In FIG. 8, a flowchart of a method of controlling the vehicle control system 120 according to various embodiments is shown. The method starts in step 51. In step S2, the first gesture 401 is detected. In step S3, the second gesture 402 is detected. Steps S2 and S3 occur in a correlated manner. For example, the detecting of the first and second gestures 401, 402 may at least partially overlap in time or even occur simultaneously. In some examples, after the first gesture is detected, a feedback is issued by the processor 105 to the user, e.g., in haptic form or as audible output. A haptic feedback may relate to a vibration of the first touch pad 101 and/or the second touch pad 102 and/or the steering wheel 110. For example, if the first gesture 401 relates to a one-finger touch-and-hold gesture (cf. FIGS. 4A-4D), the audible output "Entertainment system selected" may be issued via loudspeakers; then the detecting of the second gesture 402 in step S3 may commence.

As can be seen from the above, in any case the first and second gestures 401, 402 are not input in isolation, but in some stronger or weaker dependency with respect to each other. This is because, as part of the above-mentioned control language, an interplay between the first and second gestures 401, 402 may exist which results in specifying the particular control event on both the first and second gestures 401, 402. Namely, in step S4, the particular functional block 131-134 of the vehicle control system 120 which is to be indicated in the control message is determined based on the detected first gesture 401 of step S2; in step S5, the particular function to be executed is determined in step S5 based on both the determined functional block 131-134 and based on the detected second gesture 402. Then, in step S6, the control message is generated and sent via the data interface 106 to the vehicle control system 120. The method ends in step S7. In response to the control message, the action corresponding to the particular function to be executed (e.g., as determined in step S5) may be performed by the associated vehicle control system.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

While above various examples have been provided with respect to one particular control language where the first gesture determines the functional block and the second gesture determines the function to be executed for that functional block, various modifications and variations in this regard are possible. While in the illustrated example the functions to be executed are grouped for the various functional blocks, it would also be possible to group the various functional blocks with respect to the functions to be executed. It would also be possible that other gestures than those illustrated are employed for the identification of a particular functional block/function to be executed.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle control system 120, the first and/or second touch pads 101, 102, and/or the processor 105, described with reference to FIG. 1. The methods may be performed by executing stored instructions with one or more logic devices (e.g., processors) in combination with one or more additional hardware elements, such as storage devices, memory, hardware network interfaces/antennas, touch pads, vehicle controllers, clock circuits, vehicle systems (e.g., actuators associated with entertainment systems, navigation systems, climate systems, cruise control systems, etc.), and/or any other suitable hardware device(s). The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A user interface configured to control a vehicle control system, the user interface comprising:
a first touch pad arranged at a first position on a back side of a steering wheel of the vehicle;
a second touch pad arranged at a second position on the back side of the steering wheel, the second position being different from the first position;
a processor configured to detect a first gesture on the first touch pad and a second gesture on the second touch pad, wherein the processor is further configured to generate at least one control message for the vehicle control system based on the first gesture and based on the second gesture responsive to detecting the first and second gestures in a correlated manner; and
a data interface coupled to the processor and being configured to send the at least one control message to the vehicle control system;
wherein detecting the first and second gestures in a correlated manner comprises detecting the second gesture within a threshold time of the first gesture.

2. The user interface of claim 1, wherein the at least one control message includes an indication of a functional block of the vehicle control system, the functional block being associated with a set of functions controlling a particular vehicle component, and wherein the at least one control message further includes an indication of a function to be executed by the indicated functional block of the vehicle control system.

3. The user interface of claim 2, wherein the processor is configured to generate the indication of the functional block based on the first gesture, and wherein the processor is configured to generate the indication of the function to be executed based on the second gesture and, optionally, based on the first gesture.

4. The user interface of claim 3, wherein the processor is configured to generate the indication of the functional block based on a number of touch events of the first gesture.

5. The user interface of claim 3, wherein the processor is configured to generate the indication of the function to be executed based on one or more of a number of touch events of the second gesture and a direction of movement of a touch event of the second gesture.

6. The user interface of claim 2, wherein the functional block is one or more of an entertainment system, a climate control system, a navigation system, and a cruise control system.

7. The user interface of claim 6, wherein the function to be executed is one or more of a volume up/down control for the functional block entertainment system, a next track control for the functional block entertainment system, a next playlist control for the functional block entertainment system, a mute on/off control for the functional block entertainment system, a move in map control for the functional block navigation system, a zoom map control for the functional block navigation system, a rotate map control for the functional block navigation system, a mute route guidance control for the functional block navigation system, a temperature up/down control for the functional block climate control system, a fan speed up/down control for the functional block climate control system, an air conditioning on/off control for the functional block climate control system, a vehicle velocity up/down control for the functional block cruise control system, a set/cancel control for the functional block cruise control system, and an engage/disengage cruise control for the functional block cruise control system.

8. The user interface of claim 1, wherein the first gesture is a touch-and-hold gesture, and wherein the second gesture is a moving gesture along a primary axis of the second touch pad.

9. The user interface of claim 8, wherein the first gesture is executed with a number of fingers of a user, wherein the number of fingers is one, two, three, or four.

10. The user interface of claim 1, wherein the first touch pad is a multi-touch touch pad, wherein the second touch pad is a multi-touch touch pad, and wherein one or more of the first gesture and the second gesture are multi-touch gestures comprising a plurality of touch events.

11. The user interface of claim 1, wherein one or more of the first gesture and the second gesture is one or more of a touch-hold-and-move right gesture, a touch-hold-and-move left gesture, a touch-hold-and-move up gesture, a touch-hold-and-move down gesture, a touch-and-hold gesture, and a touch-and-release gesture.

12. The user interface of claim 1, wherein the first touch pad and the second touch pad are arranged symmetrically on the back side of the steering wheel with respect to a radial axis of the steering wheel.

13. The user interface of claim 1, wherein the first touch pad and the second touch pad each have a touch sensitive surface, and wherein the touch sensitive surfaces of the first and second touch pads are flush with an outer surface of the steering wheel.

14. The user interface of claim 1, wherein the first touch pad and the second touch pad are arranged underneath an outer surface of the steering wheel.

15. The user interface of claim 1, wherein the processor is configured to simultaneously detect the first gesture on the first touch pad and the second gesture on the second touch pad.

16. The user interface of claim 1, wherein the processor is configured to combine the detected first gesture and the detected second gesture to a combined gesture, and wherein the processor is configured to generate the at least one control message based on the combined gesture.

17. A method of controlling a vehicle control system of a vehicle, the method comprising:
   detecting, with a processor, a first gesture on a first touch pad, the first touch pad being arranged at a first position on a back side of a steering wheel of the vehicle;
   detecting, with the processor, a second gesture on a second touch pad, the second touch pad being arranged at a second position on the back side of the steering wheel of the vehicle, the second position being different from the first position;
   responsive to detecting the first and second gestures in a correlated manner, generating, with the processor, at least one control message for the vehicle control system based on the first gesture and based on the second gesture; and
   sending, with a data interface, the at least one control message to the vehicle control system;
   wherein detecting the first and second gestures in a correlated manner comprises detecting the first and second gestures simultaneously or at least partially overlapping in time.

18. The method of claim 17, wherein the at least one control message includes an indication of a functional block of the vehicle control system, each functional block being associated with a set of functions controlling a particular vehicle component, and wherein the at least one control message further includes an indication of a function to be executed by the indicated functional block of the vehicle control system.

19. The method of claim 18, wherein the generating of the indication of the functional block is based on the first gesture, and wherein the generating of the indication of the function to be executed is based on the second gesture and optionally based on the first gesture.

20. The method of claim 19, wherein the generating of the indication of the functional block is based on a number of touch events of the first gesture, and wherein the generating of the indication of the function to be executed is based on one or more of a number of touch events of the second gesture and a direction of movement of the second gesture.

* * * * *